(12) United States Patent
Zhu et al.

(10) Patent No.: US 7,820,567 B2
(45) Date of Patent: Oct. 26, 2010

(54) FABRICS MADE FROM A BLEND OF POLYPYRIDOBISIMIDAZOLE/FLAME-RETARDANT TREATED CELLULOSE FIBERS AND ARTICLES MADE THEREFROM

(75) Inventors: Reiyao Zhu, Midlothian, VA (US); Richard Young, Richmond, VA (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 203 days.

(21) Appl. No.: 12/084,506

(22) PCT Filed: Dec. 13, 2006

(86) PCT No.: PCT/US2006/061961

§ 371 (c)(1),
(2), (4) Date: May 1, 2008

(87) PCT Pub. No.: WO2007/076258

PCT Pub. Date: Jul. 5, 2007

(65) Prior Publication Data

US 2009/0140450 A1 Jun. 4, 2009

(51) Int. Cl.
*D03D 15/00* (2006.01)
(52) U.S. Cl. .................... 442/217; 139/426 R
(58) Field of Classification Search .......... 2/2.5, 2/7, 81; 57/252, 253, 255, 256, 257, 258, 57/259, 260; 139/426 R; 428/357, 359, 428/364, 365, 368, 395, 920, 921; 442/136, 442/301, 414, 415, 416, 217
See application file for complete search history.

(56) References Cited

U.S. PATENT DOCUMENTS

| 4,533,692 | A | * | 8/1985 | Wolfe et al. ................ 524/417 |
| 5,417,752 | A | | 5/1995 | Paren et al. |
| 5,674,969 | A | | 10/1997 | Sikkema et al. |
| 2006/0234578 | A1 | * | 10/2006 | Paire .......................... 442/136 |
| 2006/0252325 | A1 | * | 11/2006 | Matsumura et al. ........ 442/123 |
| 2007/0099533 | A1 | * | 5/2007 | Ma ............................. 442/389 |
| 2007/0137012 | A1 | * | 6/2007 | Laton .......................... 28/167 |
| 2007/0144696 | A1 | * | 6/2007 | Amma et al. ............... 162/146 |
| 2008/0146108 | A1 | * | 6/2008 | Singletary et al. .......... 442/135 |
| 2009/0139016 | A1 | * | 6/2009 | Zhu et al. .................... 2/458 |
| 2009/0247035 | A1 | * | 10/2009 | Lovasic et al. .............. 442/302 |
| 2009/0250181 | A1 | * | 10/2009 | Levit ........................... 162/146 |
| 2009/0260138 | A1 | * | 10/2009 | Zhu et al. .................... 2/458 |
| 2009/0260139 | A1 | * | 10/2009 | Zhu et al. .................... 2/458 |
| 2009/0282601 | A1 | * | 11/2009 | Zhu et al. .................... 2/81 |
| 2009/0291605 | A1 | * | 11/2009 | Thomas, Jr. ................ 442/301 |

FOREIGN PATENT DOCUMENTS

| WO | WO 92/14874 | | 9/1992 |
| WO | WO 99/27169 | * | 6/1999 |
| WO | WO 2007/070813 | | 6/2007 |

* cited by examiner

*Primary Examiner*—Arti Singh-Pandey

(57) ABSTRACT

The invention concerns flame retardant fabrics made from mixtures of polypyridobisimidazole fibers with cellulose fibers that have been treated to make them flame retardant and articles made therefrom.

16 Claims, No Drawings

US 7,820,567 B2

FABRICS MADE FROM A BLEND OF POLYPYRIDOBISIMIDAZOLE/FLAME-RETARDANT TREATED CELLULOSE FIBERS AND ARTICLES MADE THEREFROM

FIELD OF THE INVENTION

The invention concerns flame retardant fabrics made from mixtures of polypyridobisimidazole fibers with cellulose fibers that have been treated to make them flame retardant and articles made therefrom.

BACKGROUND OF THE INVENTION

Polypyridobisimidazole polymer is a rigid rod polymer. Fiber made from this polymer (such as the polymer composition of which is referred to as PIPD and is known as the polymer used to make M5® fiber) is known to be useful in both cut and flame resistant protective apparel. See for example, PCT Patent Application Nos. WO199902169 and WO2005002376. Rigid-rod polymer fibers having strong hydrogen bonds between polymer chains, e.g., polypyridobisimidazoles, have been described in U.S. Pat. No. 5,674,969 to Sikkema et al. An example of a polypyridobisimidazole is poly(1,4-(2,5-dibydroxy)phenylene-2,6-pyrido[2,3-d:5,6-d'] bisimidazole), which can be prepared by the condensation polymerization of tetraaminopyridine and 2,5-dihydroxyterephthalic acid in polyphosphoric acid. Sikkema describes that in making one- or two-dimensional objects, such as fibers, films, tapes, and the like, it is desired that polypyridobisimidazoles have a high molecular weight corresponding to a relative viscosity ("$V_{rel}$" or "$\eta_{rel}$") of at least about 3.5, preferably at least about 5, and more particularly equal to or higher than about 10, when measured at a polymer concentration of 0.25 g/dl in methane sulfonic acid at 25° C. Sikkema also discloses that good fiber spinning results are obtained with poly[pyridobisimidazole-2,6-diyl(2,5-dihydroxy-p-phenylene)] having relative viscosities greater than about 12, and that relative viscosities of over 50 (corresponding to inherent viscosities greater than about 15.6 dl/g) can be achieved.

Thermal and flame retardant protective apparel has been used by firefighters, emergency response personnel, members of the military and racing personnel, as well as industrial workers to save lives and reduce injury due to fires and other thermal events. While polypyridobisimidazole fiber has excellent fire resistant properties, superior in many respects to most other fibers, it also has a high modulus of elasticity. One concern with using such fibers is that they have a high modulus and may create fabrics that are relatively stiff and uncomfortable to wear. There is, however, a desire to incorporate the superior fire resistance of polypyridobisimidazole fibers into fabrics to take advantage of their superior flame resistant properties. Thus, there is a need for a fabric containing polypyridobisimidazole that is both comfortable and still provides good fire retardancy.

SUMMARY OF THE INVENTION

In one aspect, the invention concerns flame resistant fabrics comprising polypyridobisimidazole fiber and flame retardant treated cellulose fiber. The weight ratio of polypyridobisimidazole fiber to cellulose fiber is from about 1:1 to about 1:35. In certain embodiments, the weight ratio of polypyridobisimidazole fiber to cellulose fiber is from about 1:10 to about 1:35. In yet other embodiments, the weight ratio of polypyridobisimidazole fiber to cellulose fiber is from about 1:20 to about 1:35.

The polypyridobisimidazole fiber useful in this invention has an inherent viscosity of at least 20 dl/g. Certain fibers have an inherent viscosity of at least 25 dl/g or at least 28 dl/g. In some embodiments, the polypyridobisimidazolepolypyridobisimidazole fiber is made from poly[2,6-diimidazo[4,5-b:4,5-e]-pyridinylene-1,4-(2,5-dihydroxy)phenylene) (PTPD) polymer.

Cellulose fibers include cotton, rayon, acetate, triacetate, and lyocell. In certain embodiments of the invention, the cellulose fiber is cotton fiber.

In some embodiments, the polypyridobisimidazole and cellulose fibers are present as staple fibers. In certain embodiments, fibers are continuous filament fibers.

In some embodiments, the staple fibers are incorporated into the fabric in the form of staple yarns. In some fabrics, the polypyridobisimidazole and cellulose fibers are present as continuous filament yarns.

In some embodiments, the fabric is in the form of a woven/knitted fabric. In yet other embodiments, the fabric is a nonwoven fabric.

The invention also relates to protective garments comprising the flame resistant fabrics of the instant invention. In another embodiment, the invention concerns protective articles comprising the flame resistant fabric of invention.

Another aspect of the invention is a method of producing a flame resistant fabric comprising weaving fibers that include (a) polypyridobisimidazole fiber and (b) a flame retardant treated cellulose fiber; the weight ratio of polypyridobisimidazole fiber to cellulose fiber being is from 1:1 to 1:35; and the polypyridobisimidazole fiber having an inherent viscosity of greater than 20 dl/g. In a preferred embodiment the polypyridobisimidazole fiber is poly[2,6-diimidazo[4,5-b:4,5-e]-pyridinylene-1,4(2,5-dihydroxy)phenylene) fiber and the cellulose fiber is cotton.

In another aspect, the invention is a method of producing a flame resistant woven or nonwoven fabric comprising the steps of a) forming a fabric of fibers comprising polypyridobisimidazole fiber and cellulose fiber; the weight ratio of polypyridobisimidazole fiber to cellulose fiber being from 1:1 to 1:35 and the polypyridobisimidazole fiber having an inherent viscosity of greater than 20 dl/g; and b) treating the fabric with a flame retardant chemical compatible with the cellulose fibers and the polypyridobisimidazole fibers. In a preferred embodiment the polypyridobisimidazole fiber is poly[2,6-diimidazo[4,5-b:4,5-e]-pyridinylene-1,4(2,5-dihydroxy) phenylene) fiber and the cellulose fiber is cotton.

DETAILED DESCRIPTION OF ILLUSTRATIVE EMBODIMENTS

The present invention may be understood more readily by reference to the following detailed description of illustrative and preferred embodiments that form a part of this disclosure. It is to be understood that the scope of the claims is not limited to the specific devices, methods, conditions or parameters described and/or shown herein, and that the terminology used herein is for the purpose of describing particular embodiments by way of example only and is not intended to be limiting of the claimed invention. Also, as used in the specification including the appended claims, the singular forms "a," "an," and "the" include the plural, and reference to a particular numerical value includes at least that particular value, unless the context clearly dictates otherwise. When a range of values is expressed, another embodiment includes from the one particular value and/or to the other particular value. Similarly, when values are expressed as approximations, by use of the antecedent "about," it will be understood that the particular value forms another embodiment. All ranges are inclusive and combinable.

This invention relates to a flame resistant fabric comprising polypyridobisimidazole fiber and flame retardant treated cellulose fiber, the weight ratio of polypyridobisimidazole fiber to the cellulose fibers being from 1:1 to 1:35; and the polypyridobisimidazole fiber having an inherent viscosity of greater than 20 dl/g.

For purposes herein, the term "fiber" is defined as a relatively flexible, macroscopically homogeneous body having a high ratio of length to width across its cross-sectional area perpendicular to its length. The fiber cross section can be any shape, but is typically round. Herein, the term "filament" or "continuous filament" is used interchangeably with the term "fiber."

As used herein, the term "staple fibers" refers to fibers that are cut to a desired length or fibers that occur naturally with or naturally have a low ratio of length to width across its cross-sectional area perpendicular to its length when compared with filaments. Length can vary from about 0.1 inch to several feet. In some embodiments, the length is from 0.1 inch to about 8 inches. Man made staple fibers are cut to a length suitable for processing on cotton, woolen, or worsted yarn spinning equipment.

The staple fibers can have (a) substantially uniform length, (b) variable or random length, or (c) subsets of the staple fibers have substantially uniform length and the staple fibers in the other subsets have different lengths, with the staple fibers in the subsets mixed together forming a substantially uniform distribution.

In some embodiments, suitable staple fibers have a length of 1 to 30 centimeters. Staple fibers made by short staple processes result in a fiber length of 1 to 6 centimeters.

The staple fibers can be made by any process. The staple fibers can be formed by stretch breaking continuous fibers resulting in staple fibers with deformed sections that act as crimps. The staple fibers can be cut from continuous straight fibers using a rotary cutter or a guillotine cutter resulting in straight (i.e., non crimped) staple fiber, or additionally cut from crimped continuous fibers having a saw tooth shaped crimp along the length of the staple fiber, with a crimp (or repeating bend) frequency of no more than 8 crimps per centimeter.

Stretch broken staple fibers can be made by breaking a tow or a bundle of continuous filaments during a stretch break operation having one or more break zones that are a prescribed distance creating a random variable mass of fibers having an average cut length controlled by break zone adjustment.

Staple fibers of this invention can be converted into yarns using traditional long and short staple ring spinning processes which are well known in the art. For short staple, cotton system spinning fiber lengths from ¾ inch to 2¼ inch (i.e., 1.9 to 5.7 cm.) are typically used. For long staple, worsted or woolen system spinning, fibers up to 6½ inches (i.e., 16.5 cm.) are typically used. However, this is not intended to be limiting to ring spinning because the yarns may also be spun using air jet spinning, open end spinning, and many other types of spinning which converts staple fiber into useable yarns.

The stretch broken staple fibers typically have length of up to 7 inches (i.e., 17.8 cm.) long and can be 15 inches made using traditional stretch-broken tow to top staple processes. Staple fibers having maximum lengths of up to around 20 inches (i.e., 51 cm) are possible through processes as described for example in PCT Patent Application No. WO 0077283. Yarns are so made by consolidated fibers into spun yarn using filament entanglement with air jets having a tenacity in the range of 3 to 7 grams per decitex. These yarns may have secondary twist, that is, they may be twisted after formation to impart more tenacity to the yarn, in which case the tenacity can be in the 10 to 18 grams per denier (i.e., 9 to 17 grams per dtex) range. Stretch broken staple fibers normally do not require crimp because the process imparts a degree of crimp into the fiber.

The term continuous filament refers to a flexible fiber having relatively small-diameter and whose length is longer than those indicated for staple fibers. Continuous filament fibers can be converted to multifilament yarns by processes well known to those skilled in the art.

Fabrics of this invention can take on numerous configurations, including, but not limited to, knitted or woven fabrics or non-woven structures. Such fabric configurations are well known to those skilled in the art.

By "non-woven" fabric is meant a network of fibers, including unidirectional (if contained within a matrix resin), felt, fiber batts, and the like.

By "woven" fabric is meant a fabric woven using any fabric weave, such as plain weave, crowfoot weave, basket weave, satin weave, twill weave, and the like. Plain and twill weaves are believed to be the most common weaves used in the trade.

The instant invention utilizes polypyridobisimidazole fiber. This fiber is a rigid rod polymer that is of high strength. The polypyridobisimidazole fiber has an inherent viscosity of at least 20 dl/g or at least 25 dl/g or at least 28 dl/g. Such fibers include PIPD fiber (also known as M5® fiber and fiber made from poly[2,6-diimidazo[4,5-b:4,5-e]-pyridinylene-1,4(2,5-dihydroxy)phenylene). PIPD fiber is based on the structure:

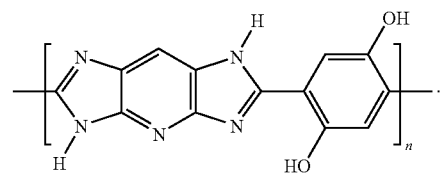

Polypyridobisimidazole fiber can be distinguished from the well known commercially available PBI fiber or polybenzimidazole fiber in that that polybenzimidazole fiber is a polybibenzimidazole. Polybibenzimidazole fiber is not a rigid rod polymer and has low fiber strength and low tensile modulus when compared to polypyridobisimidazoles.

PIPD fibers have been reported to have the potential to have an average modulus of about 310 GPa (2100 grams/denier) and an average tenacities of up to about 5.8 GPa (39.6 grams/denier). These fibers have been described by Brew, et al., *Composites Science and Technology* 1999, 59, 1109; Van der Jagt and Beukers, *Polymer* 1999, 40, 1035; Sikkema, *Polymer* 1998, 39, 5981; Klop and Lammers, *Polymer,* 1998, 39, 5987; Hageman, et al., *Polymer* 1999, 40, 1313.

The instant compositions also contain at least one cellulose fiber that has been chemically treated to make the cellulose fiber flame retardant. Such fibers can have either fire retardant chemicals incorporated into the fibers or the fibers can have topical treatments to either the fibers themselves. The most preferred method of making the fibers fire retardant is by applying the fire retardant chemicals to the fabric containing the cellulose fibers after the fabrics are formed.

In some embodiments, the preferred cellulose fiber is cotton. The cellulose fiber used in the practice of this invention can be any that are usually used in fabric and apparel applications. The preferred cotton fibers are generally 0.5 to 5 centimeters long. Flame retardant cellulosic staple fibers are comprised of one or more cellulosic fibers and one or more flame retardant compounds. Cellulosic fibers, such as rayon, acetate, triacetate, and lyocell, which are generic terms for fibers derived from cellulose, are well-known in the art and are useful in the instant invention.

Cellulosic fibers, although softer and less expensive than inherently flame retardant fibers, are not naturally resistant to flames. To increase the flame retarding capability of these fibers, one or more flame retardants are incorporated into or with the cellulosic fibers. Such flame retardants can be incorporated by spinning the flame retardant into the cellulosic fiber, coating the cellulosic fiber with the flame retardant, contacting the cellulosic fiber with the flame retardant and allowing the cellulosic fiber to absorb the flame retardant, or any other process that incorporates a flame retardant into or with a cellulosic fiber. There are a variety of such flame retardants, including, for example, certain phosphorus compounds, like SANDOLAST 9000®, currently available from Sandoz, certain antimony compounds, and the like. Generally speaking, cellulosic fibers which contain one or more flame retardants are given the designation "FR," for flame retardant. Accordingly, flame retardant cellulosic fibers such as FR rayon, FR acetate, FR triacetate, and FR lyocell may be used in the present invention. Flame retardant cellulosic fibers are also available under various trademarks, such as VISIL®, which is available from Sateri Oy of Finland. VISIL® fiber contains silicon dioxide in the form of polysilicic acid in a cellulose supporting structure wherein the polysilicic acid contains aluminum silicate sites. When the intimate blends of this invention comprise VISIL® fibers, the VISIL® fibers should be present in an amount of no more than 40 percent by weight of the intimate blend. Methods for making flame retardant cellulosic fibers are generally disclosed in, for example, U.S. Pat. No. 5,417,752.

One method of making rigid rod polypyridoimidazole polymer is disclosed in detail in U.S. Pat. No. 5,674,969 to Sikkema et al. Polypyridoimidazole polymer may be made by reacting a mix of dry ingredients with a polyphosphoric acid (PPA) solution. The dry ingredients may comprise pyridobisimidazole-forming monomers and metal powders. The polypyridobisimidazole polymer used to make the rigid rod fibers used in the fabrics of this invention should have at least 25 and preferably at least 100 repetitive units. The polypyridobisimidazole fiber useful in this invention has an inherent viscosity of at least 20 dl/g. Certain fibers have an inherent viscosity of at least 25 dl/g or at least 28 dl/g.

For the purposes of this invention, the relative molecular weights of the polypyridoimidazole polymers are suitably characterized by diluting the polymer products with a suitable solvent, such as methane sulfonic acid, to a polymer concentration of 0.05 g/dl, and measuring one or more dilute solution viscosity values at 30° C. Molecular weight development of polypyridoimidazole polymers of the present invention is suitably monitored by, and correlated to, one or more dilute solution viscosity measurements. Accordingly, dilute solution measurements of the relative viscosity ("$V_{rel}$" or "$\eta_{rel}$" or "$n_{rel}$") and inherent viscosity ("$V_{inh}$" or "$\eta_{inh}$" or "$n_{inh}$") are typically used for monitoring polymer molecular weight. The relative and inherent viscosities of dilute polymer solutions are related according to the expression $$V_{inh}=\ln(V_{rel})/C,$$

where ln is the natural logarithm function and C is the concentration of the polymer solution. $V_{rel}$ is a unitless ratio of the polymer solution viscosity to that of the solvent free of polymer, thus $V_{inh}$ is expressed in units of inverse concentration, typically as deciliters per gram ("dl/g"). Accordingly, in certain aspects of the present invention the polypyridoimidazole polymers are produced that are characterized as providing a polymer solution having an inherent viscosity of at least about 20 dl/g at 30° C. at a polymer concentration of 0.05 g/dl in methane sulfonic acid. Because the higher molecular weight polymers that result from the invention disclosed herein give rise to viscous polymer solutions, a concentration of about 0.05 g/dl polymer in methane sulfonic acid is useful for measuring inherent viscosities in a reasonable amount of time.

Exemplary pyridobisimidazole-forming monomers useful in this invention include 2,3,5,6-tetraaminopyridine and a variety of acids, including terephthalic acid, bis-(4-benzoic acid), oxy-bis-(4-benzoic acid), 2,5-dihydroxyterephthalic acid, isophthalic acid, 2,5-pyridodicarboxylic acid, 2,6-napthalenedicarboxylic acid, 2,6-quinolinedicarboxylic acid, or any combination thereof. Preferably, the pyridobisimidazole forming monomers include 2,3,5,6-tetraaminopyridine and 2,5-dihydroxyterephthalic acid. In certain embodiments, it is preferred that that the pyridoimidazole-forming monomers are phosphorylated. Preferably, phosphorylated pyridoimidazole-forming monomers are polymerized in the presence of polyphosphoric acid and a metal catalyst.

Metal powders can be employed to help build the molecular weight of the final polymer. The metal powders typically include iron powder, tin powder, vanadium powder, chromium powder, and any combination thereof.

The pyridobisimidazole-forming monomers and metal powders are mixed and then the mixture is reacted with polyphosphoric acid to form a polypyridoimidazole polymer solution. Additional polyphosphoric acid can be added to the polymer solution if desired. The polymer solution is typically extruded or spun through a die or spinneret to prepare or spin the filament.

The fabrics of this invention are useful in and can be incorporated into articles, including protective articles and garments, especially garments known as turnout gear which are useful for firefighters, and garments also have use in industrial applications where workers may be exposed to abrasive and mechanically harsh environments where fire and flame protection is needed. The garments may include coats, coveralls, jackets, pants, sleeves, aprons, and other types of apparel where protection against fire, flame, and heat is needed.

One embodiment of this invention relates to a method of producing a flame resistant fabric comprising weaving fibers that comprise: polypyridobisimidazole fiber and flame-retardant treated cellulosic fiber; the weight ratio of polypyridobisimidazole fiber to cellulose fiber being from 1:1 to 1:35; and the polypyridobisimidazole fiber having an inherent viscosity of greater than 20 dl/g. This method is most useful when the cellulose fiber has been either spun in flame retardant chemicals or the flame retardant chemicals have been applied to and absorbed into the fiber, and/or applied topically to the surface of the fiber. The preferred polypyridobisimidazole fiber useful in this process is poly[2,6-diimidazo[4,5-b:4,5-e]-pyridinylene-1,4(2,5-dihydroxy)phenylene) fiber, while the preferred cellulose fiber is cotton.

Another embodiment of this invention, preferred in many respects, relates to a method of producing a flame resistant fabric comprising the steps of a) forming a fabric of fibers comprising polypyridobisimidazole fiber and cellulose fiber; the weight ratio of polypyridobisimidazole fiber to cellulose fiber being from 1:1 to 1:35 and the polypyridobisimidazole fiber having an inherent viscosity of greater than 20 dl/g; and b) treating the fabric with a flame retardant chemical compatible with the cellulose fibers and the polypyridobisimidazole fibers. An especially preferred embodiment of this process involves first forming a fabric of polypyridoimidazole fiber and cellulose fiber that does not have any initial flame retardant treatment, followed by treatment of the entire fabric to impart flame retardancy to the cellulose fiber. Such methods can be preferred because of their flexibility; for example, the fabric can be dyed and subsequently treated with the flame retardant chemicals. The preferred polypyridobisimidazole fiber useful in this process is poly[2,6-diimidazo[4,5-b:4,5-e]-pyridinylene 1,4(2,5-dihydroxy)phenylene) fiber, while the preferred cellulose fiber is cotton.

The invention is illustrated by, but is not intended to be limited by the following examples.

Test Methods

Thermal Protective Performance Test (TPP)

The predicted protective performance of a fabric in heat and flame is measured using the "Thermal Protective Performance Test" NFPA 2112 (referred to as "TPP"). A flame is directed at a section of fabric mounted in a horizontal position at a specified heat flux (typically 84 kW/m$^2$). The test measures the transmitted heat energy from the source through the specimen using a copper slug calorimeter with no space between the fabric and heat sensor. The test endpoint is characterized by the time required to attain a predicted second-degree skin burn injury using a simplified model developed by Stoll & Chianta, "Transactions New York Academy Science", 1971, 33 p 649. The value assigned to a specimen in this test, denoted as the TPP value, is the total heat energy required to attain the endpoint, or the direct heat source exposure time to the predicted burn injury multiplied by the incident heat flux. Higher TPP values denote better insulation performance.

Abrasion Resistance Test

Abrasion resistance is determined using ASTM method D3884-80, with a H-18 wheel, 500 gm load on a Tabor abrasion resistance available from Teledyne Taber, 455 Bryant St., North Tonawanda, N.Y. 14120. Taber abrasion resistance is reported as cycles to failure.

Grab Strength Test

The grab strength measurement, which is a determination of breaking strength and elongation of fabric or other sheet materials, is based on ASTM D5034. A 100-mm (4.0 in.) wide specimen is mounted centrally in clamps of a tensile testing machine and a force applied until the specimen breaks. Values for the breaking force and the elongation of the test w specimen are obtained from machine scales or a computer interfaced with testing machine.

Tear Strength Test

The tear strength measurement (also referred to as "TRAP Tear") is based on ASTM D 5587-96. This test method covers the measurement of the tear strength of textile fabrics by the trapezoid procedure using a recording constant-rate-of-extension-type (CRE) tensile testing machine. Tear strength, as measured in this test method, requires that the tear be initiated before testing. The specimen is slit at the center of the smallest base of the trapezoid to start the tear. The nonparallel sides of the marked trapezoid are clamped in parallel jaws of a tensile testing machine. The separation of the jaws is increased continuously to apply a force to propagate the tear across the specimen. At the same time, the force developed is recorded. The force to continue the tear is calculated from autographic chart recorders or microprocessor data collection systems. Two calculations for trapezoid tearing strength are provided: the single-peak force and the average of five highest peak forces. For the examples of this patent, the single-peak force is used.

Vertical Flame Test

The vertical flame test is performed as described in ASTM D6143. According to the test, a section of fabric is mounted vertically and a specified flame is applied to its lower edge for twelve seconds. The response of the fabric to the flame exposure is recorded. The length of the fabric that is burned or charred was measured. Times for afterflame (i.e., the continued burning of the fabric section after removing the test flame) and afterglow (characterized by smoldering of the fabric section after removing the test flame) are also measured. Additionally, observations regarding melting and dripping from the fabric section were recorded. Pass/fail specifications based on this method are established for industrial worker clothing, firefighter turnout gear and flame retardant station wear, and military clothing. A fabric can be considered fire resistant if it has a char length of less than six inches after a twelve second exposure to a flame, which is a standard industry conception of fire resistant.

ARC Rating

The arc resistance of fabrics of this invention is determined in accordance with ASTM F-1959-99 "Standard Test Method for Determining the Arc Thermal Performance Value of Materials for Clothing". The test method determines the incident energy which would predict a second degree burn injury when the material(s) is exposed to heat energy from an arc. During this procedure, the amount of heat energy transferred by the material(s) is measured during and after exposure to an arc. The heat flux of the exposure and that transferred by the test specimen(s) are both measured with calorimeters. The rate at which the temperature of the calorimeters increases is a direct measure of the heat energy received. Heat transfer data is used to predict the onset of second degree burn using the Stoll curve. Then, arc rating is determined.

Example 1

A thermally protective and durable fabric is prepared having in both the warp and fill ring spun yarns of intimate blends of FR rayon staple fiber, polypyridobisimidazole staple fiber. FR rayon is a cellulosic fiber with certain phosphorus compounds, the polypyridobisimidazole staple fiber is made from PIPD polymer and is marketed by Magellan Systems International under the trademark M5®.

A picker blend sliver of 35 wt. % of polypyridobisimidazole, 65% FR rayon fiber is prepared and processed by conventional cotton system equipment and is then spun into a spun staple yarn having twist a multiplier of 4.0 and single yarn size of about 21 tex (28 cotton count) using a ring spinning frame. Two single yarns are then plied on a plying machine to make a two-ply yarn. Using a similar process and the same twist and blend ratio, a 24 tex (24 cotton count) yarn is made for use as a fill yarn. As before, two of these single yarns are plied to form a two-ply yarn.

The FR rayon/polypyridobisimidazole blend yarns are then used as the warp and fill yarns and are woven into a fabric on a shuttle loom, making a greige fabric having a 2×1 twill weave and a construction of 26 ends×17 picks per cm (72 ends×52 picks per inch), and a basis weight of about 200 g/m$^2$ (6 oz/yd$^2$). The greige twill fabric is then scoured in hot water and is dried under low tension. The scoured fabric is then jet dyed using basic dye. The finished fabric has a basis weight of about 215 g/m$^2$ (6.5 oz/yd$^2$).

Example 2

A thermally protective and durable fabric is prepared as in Example 1 except that the picker blend sliver has 15 wt. % polypyridobisimidazole fiber, 85% cotton. As in Example 1, the greige twill fabric has a construction of 26 ends×17 picks per cm (72 ends×52 picks per inch), and a basis weight of about 200 g/m² (6 oz/yd²), and after scouring, drying under low tension and dying with basic dyes has a finished fabric basis weight of about 215 g/m² (6.5 oz/yd²). The fabric is then going the flame resistance chemical treatment.

Example 3

Comparative Example

A thermal protective and durable fabric, to be used as a control, is prepared as in Example 1 & 2 except that the picker blend sliver has 100% flame resistance treated cotton fabric.

TABLE 1

|  | Control | Example 1 | Example 2 |
| --- | --- | --- | --- |
| Nominal Basis Weight (opsy) | 6.5 | 6.5 | 6.5 |
| Grab Test Break Strength (lbf) W/F | 0 | + | + |
| Trap Tear (lbf) W/F | 0 | + | + |
| Taber Abrasion (Cycles)CS-10/1000 g | 0 | + | + |
| TPP (cal/cm2) | 0 | + | + |
| Vertical Flame (in) W/F | 0 | + | + |
| ARC rating(cal/cm2) | 0 | + | + |

In Table 1, a "+" indicates that the fabric is expected to have superior properties to those of the control fabric. The notation "0" indicates the performance of the control fabric or performance equivalent to the control fabric.

All patents and publications disclosed herein are incorporated by reference in their entirety.

What is claimed:

1. A flame resistant fabric comprising:
   polypyridobisimidazole fiber, and
   flame retardant treated cellulose fiber,
   wherein the weight ratio of polypyridobisimidazole fiber to the cellulose fibers is from about 1:1 to about 1:35; and
   the polypyridobisimidazole fiber has an inherent viscosity of greater than 20 dl/g,
   wherein the flame resistant fabric is woven.

2. The fabric of claim 1, where the weight ratio of polypyridobisimidazole to cellulose fiber is from about 1:10 to about 1:35.

3. The fabric of claim 2, where the weight ratio of polypyridobisimidazole to cellulose fiber is from about 1:20 to about 1:35.

4. The fabric of claim 1, wherein the polypyridobisimidazole fiber has an inherent viscosity of greater than 28 dl/g.

5. The fabric of claim 1, wherein the polypyridobisimidazole and cellulose fibers are present as staple fibers.

6. The fabric of claim 1, wherein the cellulose fiber is cotton, rayon, acetate, triacetate, or lyocell.

7. The fabric of claim 6, wherein the cellulose fiber is cotton.

8. The fabric of claim 7 comprising cotton that is about 1 to about 6 cm in length.

9. The fabric of claim 1, wherein the cellulose fibers are present as continuous filament fibers.

10. The fabric of claim 1, where the polypyridobisimidazole fiber is poly[2,6-diimidazo[4,5-b:4,5-e]-pyridinylene-1,4(2,5-dihydroxy)phenylene) fiber.

11. A protective garment comprising the flame resistant fabric of claim 1.

12. A protective article comprising the flame resistant fabric of claim 1.

13. A method of producing a flame resistant fabric comprising:
    weaving fibers that comprise: polypyridobisimidazole fiber and flame-retardant treated cellulosic fiber;
    the weight ratio of polypyridobisimidazole fiber to cellulose fiber being from 1:1 to 1:35; and
    the polypyridobisimidazole fiber having an inherent viscosity of greater than 20 dl/g,
    wherein the flame resistant fabric is woven.

14. The method of claim 13 wherein the polypyridobisimidazole fiber is poly[2,6-diimidazo[4,5-b:4,5-e]-pyridinylene-1,4(2,5-dihydroxy)phenylene) fiber and the cellulose fiber is cotton.

15. The method of producing a flame resistant fabric comprising the steps of
    a) forming a fabric of fibers comprising polypyridobisimidazole fiber and cellulose fiber; the weight ratio of polypyridobisimidazole fiber to cellulose fiber being from 1:1 to 1:35 and the polypyridobisimidazole fiber having an inherent viscosity of greater than 20 dl/g; and
    b) treating the fabric with a flame retardant chemical compatible with the cellulose fibers and the polypyridobisimidazole fibers,
    wherein the flame resistant fabric is woven.

16. The method of claim 15 wherein the polypyridobisimidazole fiber is poly[2,6-diimidazo [4,5-b:4,5-e]-pyridinylene-1,4(2,5-dihydroxy)phenylene) fiber and the cellulose fiber is cotton.

* * * * *